US011888393B2

(12) United States Patent
Venkateswaran et al.

(10) Patent No.: US 11,888,393 B2
(45) Date of Patent: Jan. 30, 2024

(54) MULTIPHASE CONTROLLER COMMUNICATION

(71) Applicant: Texas Instruments Incorporated, Dallas, TX (US)

(72) Inventors: Muthusubramanian Venkateswaran, Bengaluru (IN); Rohit Narula, Bengaluru (IN); Preetam Charan Anand Tadeparthy, Bengaluru (IN); Matthew John Ascher Schurmann, Manchester, NH (US); Rajesh Venugopal, Nashua, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 105 days.

(21) Appl. No.: 17/537,595

(22) Filed: Nov. 30, 2021

(65) Prior Publication Data

US 2023/0170796 A1 Jun. 1, 2023

(51) Int. Cl.
*H02M 3/155* (2006.01)
*H02M 1/32* (2007.01)
*H02M 1/08* (2006.01)
*H02M 1/36* (2007.01)
*H02M 3/158* (2006.01)

(52) U.S. Cl.
CPC ............ *H02M 3/155* (2013.01); *H02M 1/08* (2013.01); *H02M 1/32* (2013.01); *H02M 1/36* (2013.01); *H02M 3/1586* (2021.05)

(58) Field of Classification Search
CPC ...... H02M 3/155; H02M 3/1586; H02M 1/32; H02M 1/36
See application file for complete search history.

(56) References Cited

U.S. PATENT DOCUMENTS

| | | | | |
|---|---|---|---|---|
| 8,710,810 | B1* | 4/2014 | McJimsey | H02M 3/1584 323/283 |
| 10,199,939 | B1* | 2/2019 | Chang | H02M 3/1584 |
| 2010/0277147 | A1* | 11/2010 | Kimura | H02M 1/36 323/282 |
| 2016/0380537 | A1* | 12/2016 | Bizjak | H02M 1/36 323/271 |
| 2017/0077816 | A1* | 3/2017 | Satterfield | H02M 1/36 |
| 2017/0110963 | A1* | 4/2017 | Mattingly | H02M 3/1584 |

* cited by examiner

*Primary Examiner* — Kyle J Moody
*Assistant Examiner* — Jye-June Lee
(74) *Attorney, Agent, or Firm* — Michelle F. Murray; Frank D. Cimino

(57) ABSTRACT

A multiphase controller includes an integrator enable terminal, a pulse width modulator, an error integrator, an open drain driver, and an integrator enable circuit. The integrator enable terminal is adapted to be coupled to the integrator enable terminal of a different instance of the multiphase controller. The pulse width modulator is configured to modulate a power stage. The error integrator is configured to control the pulse width modulator. The open drain driver is coupled to the integrator enable circuit. The integrator enable circuit is coupled to the pulse width modulator, the error integrator, the open drain driver, and the integrator enable terminal. The integrator enable circuit is configured to activate the open drain driver responsive to generation of a power stage control pulse by the pulse width modulator, and activate the error integrator responsive to a logic low signal at the integrator enable terminal.

22 Claims, 4 Drawing Sheets

MULTIPHASE CONTROLLER COMMUNICATION

BACKGROUND

As systems and integrated circuits (e.g., processors, application specific integrated circuits, etc.) become more complex, the power requirements of these circuits also become more complex. Multiphase regulators are increasingly used to provide power to such systems and circuits. A multiphase regulator includes multiple (e.g., 2-12) parallel power stages each including power transistors and an inductor. A multiphase controller coordinates the switching of the power stages. The multiphase controller activates the power stages at spaced intervals to produce a desired output voltage.

SUMMARY

In one example, a multiphase controller includes an integrator enable terminal, a pulse width modulator, an error integrator, an open drain driver, and an integrator enable circuit. The error integrator is coupled to the pulse width modulator, and includes an enable input coupled to the integrator enable terminal. The open drain driver includes a current terminal and a control terminal. The current terminal is coupled to the integrator enable terminal. The integrator enable circuit includes an input coupled to the pulse width modulator, and an output coupled to the control terminal of the open drain driver.

In another example, a multiphase controller includes an integrator enable terminal, a pulse width modulator, an error integrator, an open drain driver, and an integrator enable circuit. The integrator enable terminal is adapted to be coupled to the integrator enable terminal of a different instance of the multiphase controller. The pulse width modulator is configured to modulate a power stage. The error integrator is configured to control the pulse width modulator. The open drain driver is coupled to the integrator enable circuit. The integrator enable circuit is coupled to the pulse width modulator, the error integrator, the open drain driver, and the integrator enable terminal. The integrator enable circuit is configured to activate the open drain driver responsive to generation of a power stage control pulse by the pulse width modulator, and activate the error integrator responsive to a logic low signal at the integrator enable terminal.

In a further example, a multiphase converter includes a first multiphase controller, a second multiphase controller, and a power stage. The first multiphase controller includes an integrator enable terminal, and a controller startup terminal. The power stage includes a temperature sense terminal coupled to the control startup terminal of the first multiphase controller. The second multiphase controller includes a controller startup terminal, an integrator, a pulse width modulator, an error integrator, an open drain driver, and an integrator enable circuit. The controller startup terminal of the second multiphase controller is coupled to the temperature sense terminal of the power stage. The integrator enable terminal of the second multiphase controller is coupled to the integrator enable terminal of the first multiphase controller. The pulse width modulator is configured to modulate the power stage. The error integrator is configured to control the pulse width modulator. The open drain driver is coupled to the integrator enable terminal of the second multiphase controller. The integrator enable circuit is coupled to the pulse width modulator, the error integrator, the open drain driver, and the integrator enable terminal of the second multiphase controller. The integrator enable circuit is configured to activate the open drain driver responsive to generation of a power stage control pulse by the pulse width modulator, and activate the error integrator responsive to the first multiphase controller generating a logic low signal at the integrator enable terminal of the second multiphase controller.

DETAILED DESCRIPTION

As the current demands of modern circuits increase, the number of power stages (phases) needed in a multiphase regulator to meet the current demand also increases. Each power stage is controlled via at least two pins of a multiphase controller. Thus, the multiphase controller pin count increases with the number of power stages. To enable control of the increasing number of power stages, multiphase controllers may be coupled in parallel (stacked) to the power stages. Each of the stacked multiphase controllers supports N power stages, and K stacked controllers support K*N power stages. In some systems, one of the stacked controllers serves as the primary controller, and the remainder of the stacked controllers serve as secondary controllers.

When using stacked multiphase controllers, the operation of the controllers should be coordinated to properly control the power stages. To simulate the operation of a single controller, the stacked controllers should start and stop together. Differences in clock frequency and initialization time of various analog blocks of the controllers can cause different controllers to start-up at different times. Controller start-up and shut-down should be managed to ensure that the various power supplies supported by the controllers are started and stopped in the proper order. Uncontrolled shut-down of the stacked multiphase controllers may result in system operational errors or damage if the power supplies associated with the controllers shut-down out of sequence.

The multiphase controllers described herein allow communication of startup enable signals, control loop enable signals, and fault signals between any number of stacked multiphase controllers without increasing the number of pins provided in the controller packaging. To control startup timing, each multiphase controller drives a startup enable signal using an open-drain output coupled to a package pin used receive power stage ready status. All of the stacked multiphase controllers startup when all of the stacked multiphase controllers are ready.

The package pin used to communicate the startup enable signal may also be used to communicate a fault signal to all of the stacked multiphase controllers. Each multiphase controller drives a fault signal using an open-drain output coupled to a package pin. When any multiphase controller detects a fault, the controller drives the fault signal, and all of the controllers shut down.

Each of the multiphase controllers includes an error integrator to control output voltage and/or current. Each error integrator is enabled responsive to pulse width modulation. To coordinate operation of the error integrators, each multiphase controller drives an enable signal using an open-drain output coupled to a package I/O pin. The first of the stacked multiphase controllers to generate a pulse-width modulator pulse drives the enable signal to enable the error integrators of all of the stacked multiphase controllers.

Figure 1:
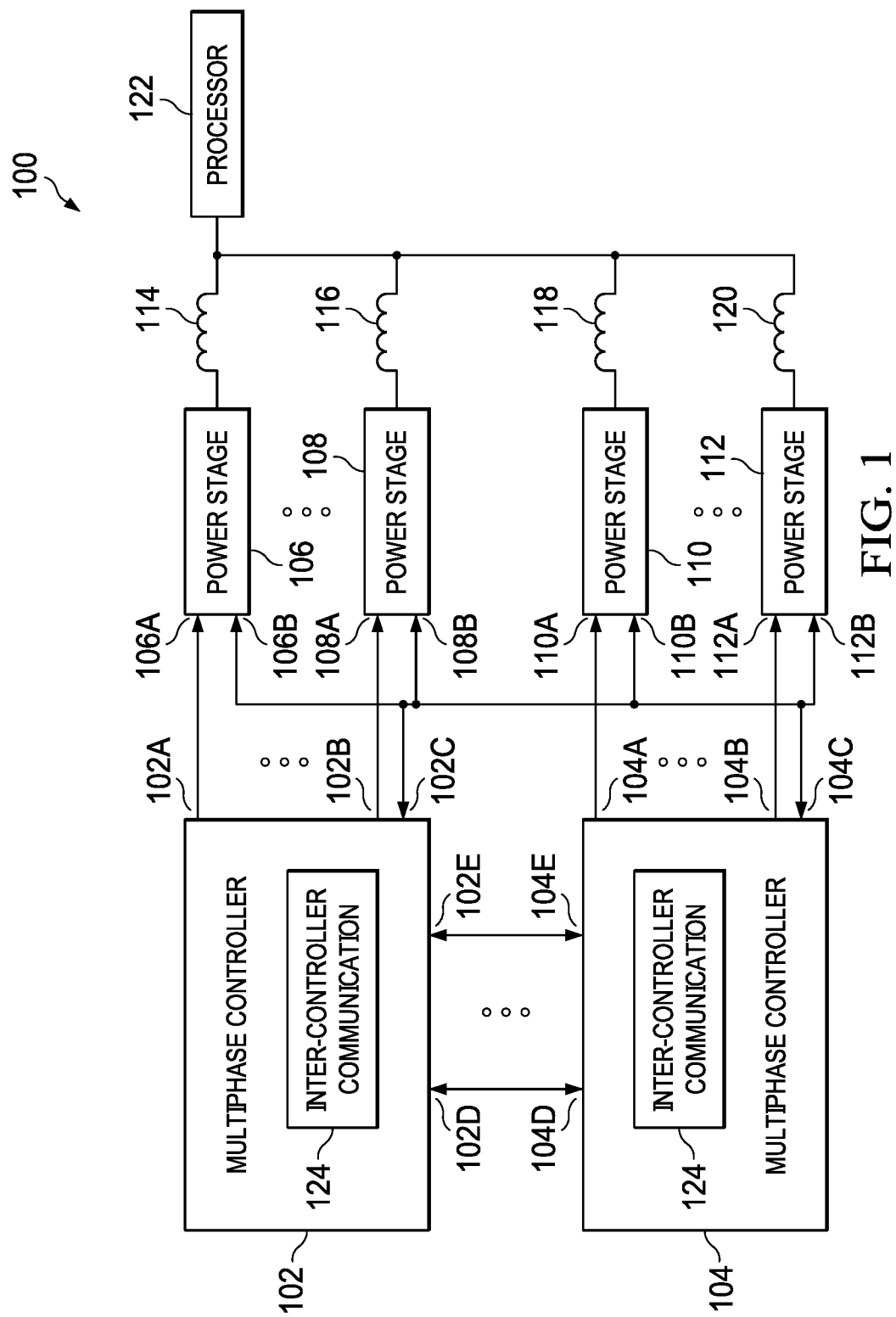
FIG. 1 is a block diagram for an example multistage DC-DC converter that includes stacked multiphase controllers with inter-controller communication.

FIG. 1 is a block diagram for an example multistage DC-DC converter 100 that includes stacked multiphase controllers with inter-controller communication. The multistage DC-DC converter 100 includes a multiphase controller 102, a multiphase controller 104, a power stage 106, a power stage 108, a power stage 110, and a power stage 112. The multiphase controller 102 may be similar or identical to the multiphase controller 104. The power stage 106, power stage 108, power stage 110, and power stage 112 may be similar or identical to one another. The power stage 106 and the power stage 108 are coupled to the multiphase controller 102. The power stage 110 and the power stage 112 are coupled to the multiphase controller 104. In practice, the multistage DC-DC converter 100 may include 2 or more multiphase controllers, and two or more power stages may be coupled to each of the multiphase controllers. Each multiphase controller controls switching of the power transistors provided in the power stages coupled to the multiphase controller to charge an inductor coupled to each power stage. For example, the multiphase controller 102 controls switching of the power stage 106 to charge the inductor 114, and controls switching of the power stage 108 to charge the inductor 116. Similarly, the multiphase controller 104 controls switching of the power stage 110 to charge the inductor 118, and controls switching of the power stage 112 to charge the inductor 120. A load circuit, such as the processor 122, is coupled to the inductors.

Pulse width modulation outputs 102A and 102B of the multiphase controller 102 are respectively coupled to pulse width modulation control inputs 106A and 108A of the power stage 106 and the power stage 108 to control switching of the power stage 106 and the power stage 108. Similarly, pulse width modulation outputs 104A and 104B of the multiphase controller 104 are respectively coupled to pulse width modulation control inputs 110A and 112A of the power stage 110 and the power stage 112 to control switching of the power stage 110 and the power stage 112.

The multiphase controller 102 and the multiphase controller 104 include inter-controller communication circuitry 124 that enables communication of synchronization information between the multiphase controller 102 and the multiphase controller 104. To reduce the number of package pins needed to provide communication between the multiphase controller 102 and the multiphase controller 104, communication is provided using package pins assigned to other functions. The synchronization functions provided by the inter-controller communication circuitry 124 include startup, integrator, and shutdown synchronization. The controller startup terminal 102C of the multiphase controller 102 is coupled to the controller startup terminal 104C of the multiphase controller 104 to provide multiphase controller startup synchronization. The temperature status terminal 106B of the power stage 106, the temperature status terminal 108B of the power stage 108, the temperature status terminal 110B of the power stage 110, and the temperature status terminal 112B of the power stage 112 are also coupled to the controller startup terminal 102C and the controller startup terminal 104C for communication of temperature information from the power stages to the multiphase controllers. Thus, communication of controller startup synchronization information is provided via package pins that are also used to receive temperature information from the power stages.

The integrator enable terminal 102D of the multiphase controller 102 is coupled to the integrator enable terminal 104D of the multiphase controller 104 for communication of integrator synchronization information between the multiphase controller 102 and the multiphase controller 104.

Fault information is communicated between the multiphase controller 102 and the multiphase controller 104 via the controller startup terminal 102C and the controller startup terminal 104C (the controller startup terminal 102C and the controller startup terminal 104C may also be referred to as controller fault terminals). Thus, fault information is communicated via package pins that are also used to communicate controller startup synchronization information and power stage temperature information. The average current terminal 102E is coupled to the average current terminal 104E for communication of average current information between the multiphase controller 102 and the multiphase controller 104. The average current terminal 102E and the average current terminal 104E are also used to communicate additional fault information between the multiphase controller 102 and the multiphase controller 104. Thus, fault information is shared via package pins that are also used to share average current information.

Figure 2:
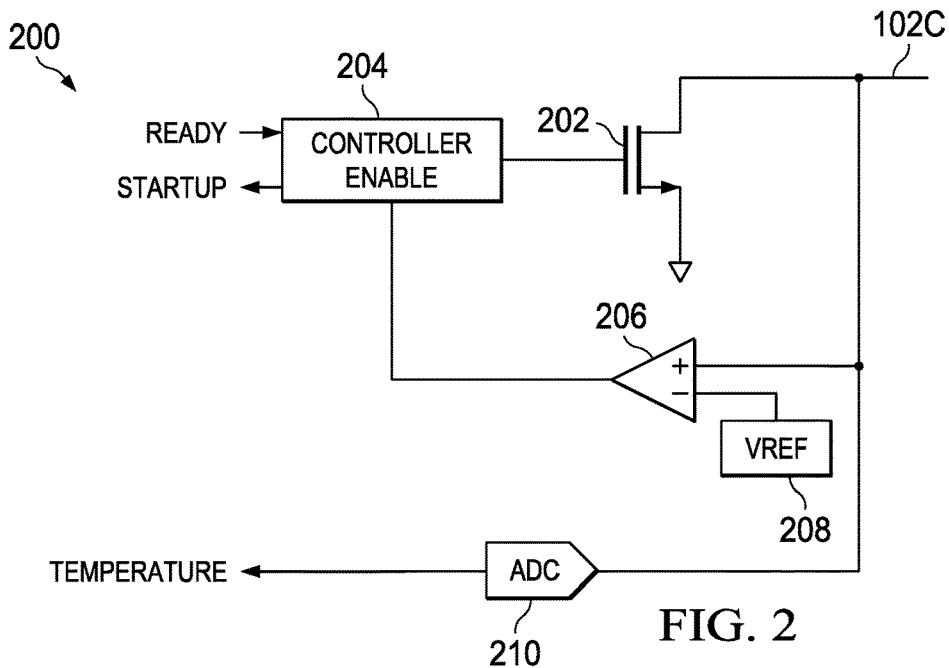
FIG. 2 is a block diagram for example startup synchronization circuitry included in the stacked multiphase controllers of FIG. 1.

FIG. 2 is a block diagram of example startup synchronization circuitry 200. The startup synchronization circuitry 200 may be included in the inter-controller communication circuitry 124 of the multiphase controller 102 and the multiphase controller 104. The startup synchronization circuitry 200 includes an open drain driver 202, a controller enable circuit 204, a comparator 206, and a voltage reference circuit 208. The open drain driver 202 is an N-type field effect transistor (FET) having a first current terminal (drain) coupled to the controller startup terminal 102C, and a second current terminal (source) coupled to ground. A control terminal (gate) of the open drain driver 202 is coupled to the controller enable circuit 204. A first input of the comparator 206 is coupled to the controller startup terminal 102C, and a second input of the comparator 206 is coupled to the voltage reference circuit 208. An output of the comparator 206 is coupled to the controller enable circuit 204.

Operation of the startup synchronization circuitry 200 is explained by reference to the multiphase controller 102. The multiphase controller 104 operates in similar fashion. At initialization of the multiphase controller 102, the controller enable circuit 204 activates the open drain driver 202 to pull down the voltage at the controller startup terminal 102C. When the multiphase controller 102 is ready to start up (power supply voltages reach operational levels, firmware has executed to a startup point, operation is enabled via externally generated signal or firmware, etc.), the controller enable circuit 204 deactivates the open drain driver 202. When the open drain drivers 202 of the multiphase controller 102 and the multiphase controller 104 are deactivated, the voltage at the controller startup terminal 102C goes high. The comparator 206 compares the voltage at the controller startup terminal 102C to a threshold provided by the voltage reference circuit 208. The threshold voltage provided by the voltage reference circuit 208 may be about 280 millivolts in some implementations of the startup synchronization circuitry 200. When the voltage at the controller startup terminal 102C exceeds the threshold, the output of the comparator 206 goes high to notify the controller enable circuit 204 that all multiphase controllers of the multistage DC-DC converter 100 are ready to start up, and the controller enable circuit 204 triggers the multiphase controller 102 to start up (e.g., start modulation of the power stages). Thus, the startup synchronization circuitry 200 synchronizes startup of the multiphase controller 102 and the multiphase controller 104 to avoid issues caused by different initialization times for various circuits (analog circuits, firmware timing, etc.) of the different multiphase controllers.

FIG. 2 also shows an analog-to-digital converter 210 coupled to the controller startup terminal 102C for digitizing temperature information received from the power stages.

Figure 3:
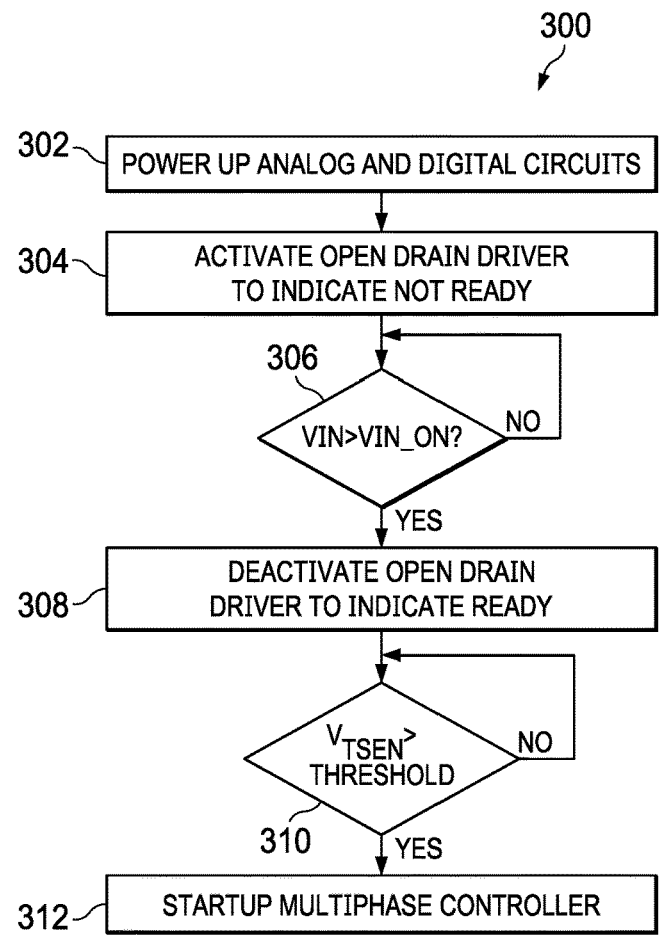
FIG. 3 is flow diagram for an example method for startup synchronization of stacked multiphase controllers.

FIG. 3 is flow diagram for an example method 300 for startup synchronization of stacked multiphase controllers 102 and 104. Though depicted sequentially as a matter of convenience, at least some of the actions shown can be performed in a different order and/or performed in parallel. Additionally, some implementations may perform only some of the actions shown. Operations of the method 300 are explained with reference to the multiphase controller 102. The multiphase controller 104 also executes the method 300.

In block 302, power is provided to the multiphase controller 102. The power may include a first voltage to power analog circuits and a second voltage to power digital circuits.

In block 304, the controller enable circuit 204 activates the open drain driver 202 to pull down the voltage at the controller startup terminal 102C. The controller enable circuit 204 may activate (turn on) the open drain driver 202 as soon as possible after power is applied to the multiphase controller 102 in block 302.

In block 306, an input voltage (Vin) provided to the multiphase controller 102 is compared to an input voltage threshold (Vin_on). When the input voltage exceeds the input voltage threshold, in block 308, the controller enable circuit 204 deactivates the open drain driver 202 to indicate that the multiphase controller 102 is ready to start up (e.g., ready to begin modulation of the power stage 106 and the power stage 108. Embodiments of the method 300 may check the state of various operating parameters of the multiphase controller 102 in block 306 to determine whether the multiphase controller 102 is ready to start up.

In block 310, the comparator 206 compares the voltage at the controller startup terminal 102C to a threshold voltage. The voltage at the multiphase controller 102 will exceed the threshold voltage when both the multiphase controller 102 and the multiphase controller 104 have deactivated the open drain driver 202 in block 306. When the voltage at the multiphase controller 102 exceeds the threshold voltage, the multiphase controller 102 starts up in block 312. Thus, only after both of the multiphase controller 102 and the multiphase controller 104 indicate ready, do either start up.

Figure 4:
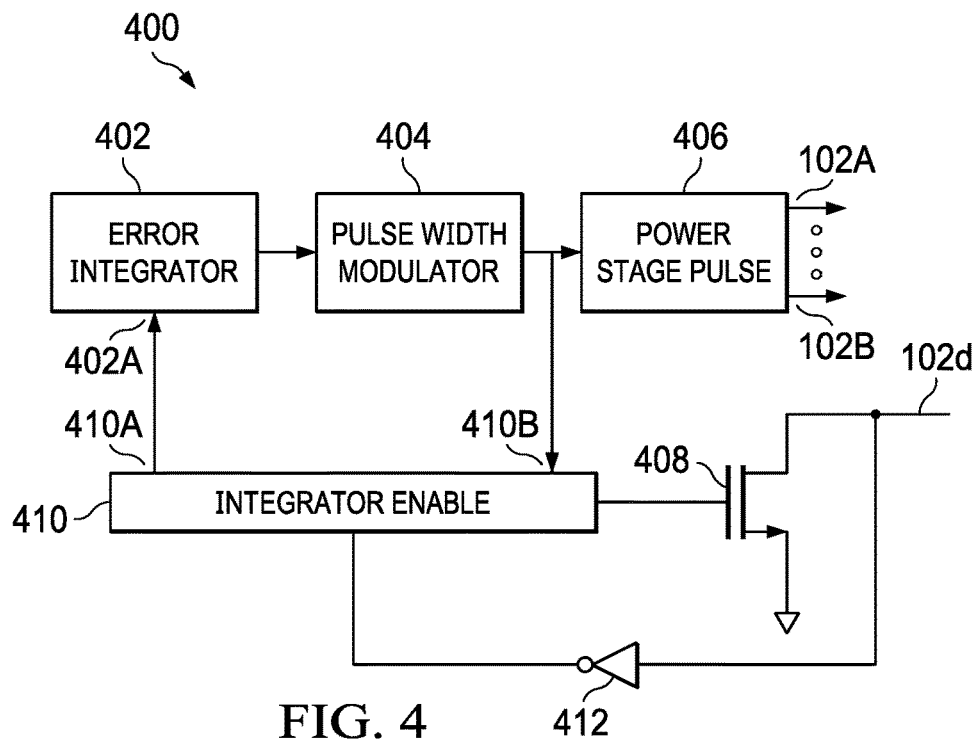
FIG. 4 is a block diagram for example integrator startup circuitry included in the stacked multiphase controllers of FIG. 1.

FIG. 4 is a block diagram for example integrator startup circuitry 400. A portion of the integrator startup circuitry 400 may be included in the inter-controller communication circuitry 124 of the multiphase controller 102 and the multiphase controller 104. The integrator startup circuitry 400 includes an error integrator 402, a pulse width modulator 404, an open drain driver 408, an integrator enable circuit 410, and an inverter 412. The open drain driver 408, the integrator enable circuit 410, and the inverter 412 may be included in the inter-controller communication circuitry 124 of the multiphase controller 102 and the multiphase controller 104. The open drain driver 408 is an N-type field effect transistor (FET) having a current terminal (drain) coupled to the integrator enable terminal 102D and a current terminal (source) coupled to ground. A control terminal (gate) of the open drain driver 408 is coupled to the integrator enable circuit 410. Operation of the integrator startup circuitry 400 is explained by reference to the multiphase controller 102. The multiphase controller 104 operates in similar fashion.

The error integrator 402 and the pulse width modulator 404 are components of the regulator control loop of the multiphase controller 102 and the power stages coupled to the multiphase controller 102. The error integrator 402 integrates an error signal that defines a difference of a reference signal and a feedback signal in the multiphase controller 102. The reference signal may be representative of a target output voltage, or may be representative of current output of the primary multiphase controller (e.g., the multiphase controller 102). The feedback signal may be representative of the output voltage of the multistage DC-DC converter 100, or may be representative of the output current of the secondary multiphase controller (e.g., the multiphase controller 104). The integrated error signal generated by the error integrator 402 is provided to the pulse width modulator 404 for controlling the pulse width modulator 404. The pulse width modulator 404 generates pulses (power stage control pulses) for regulating the output voltage of the multistage DC-DC converter 100. The power stage pulse circuitry 406 is coupled to the pulse width modulator 404, and provides PWM pulses to the power stages coupled to the multiphase controller 102.

The integrator enable circuit 410 controls activation of the error integrator 402 to ensure that the multiphase controller 102 and multiphase controller 104 start modulation of the power stages at about the same time. An output 410A of the integrator enable circuit 410 is coupled to an input 402A of the error integrator 402 for communication of an integrator enable signal. An input 410B of the integrator enable circuit 410 is coupled to the pulse width modulator 404 for receipt of a PWM output pulse. When the multiphase controller 102 is initializing (at power up), the error integrator 402 is disabled, and the integrator enable circuit 410 deactivates the open drain driver 408 to allow the voltage at the integrator enable terminal 102D to rise. When the pulse width modulator 404 generates an output pulse, the integrator enable circuit 410 activates the open drain driver 408 to pull down the voltage at the integrator enable terminal 102D. The integrator enable circuit 410 monitors the voltage at the integrator enable terminal 102D, via the inverter 412. When the voltage at the integrator enable terminal 102D is pulled down, by the open drain driver 408 of the multiphase controller 102 or the multiphase controller 104, the integrator enable circuit 410 enables the error integrator 402, via an enable signal provided at the output 410A. Thus, when either the multiphase controller 102 or the multiphase controller 104 generates a PWM pulse, the error integrators in both the multiphase controller 102 and the multiphase controller 104 are enabled to regulate the output voltage of the multistage DC-DC converter 100.

Figure 5:
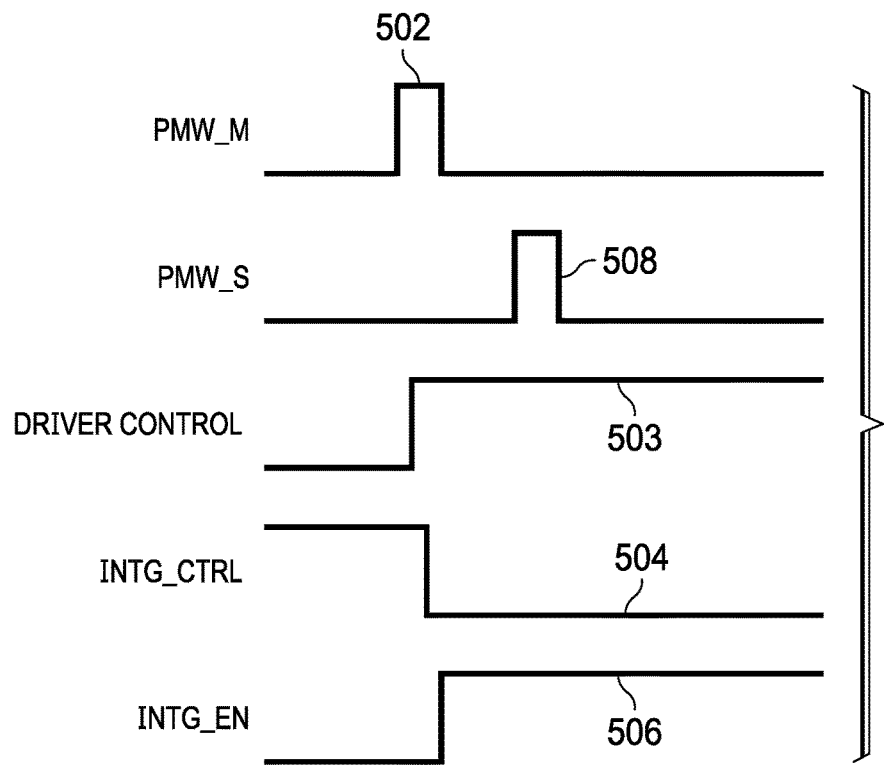
FIG. 5 shows an example of signals in the integrator startup circuitry of FIG. 4.

FIG. 5 shows an example of signals in the integrator startup circuitry 400. When the pulse width modulator 404 of the multiphase controller 102 generates the PWM pulse 502, the integrator enable circuit 410 activates the driver control signal 503 (DRIVER CONTROL) to turn on the open drain driver 408 and pull the voltage 504 (INTG_CTRL) at the integrator enable terminal 102D low. The integrator enable circuit 410 of the multiphase controller 102 and the multiphase controller 104 detect the voltage 504 low, and activate the integrator enable signal 506 (INTG_EN) to enable the error integrators 402 in the multiphase controller 102 and the multiphase controller 104. With its error integrator 402 enabled, the multiphase controller 404 generates the PWM pulse 508.

Figure 6:
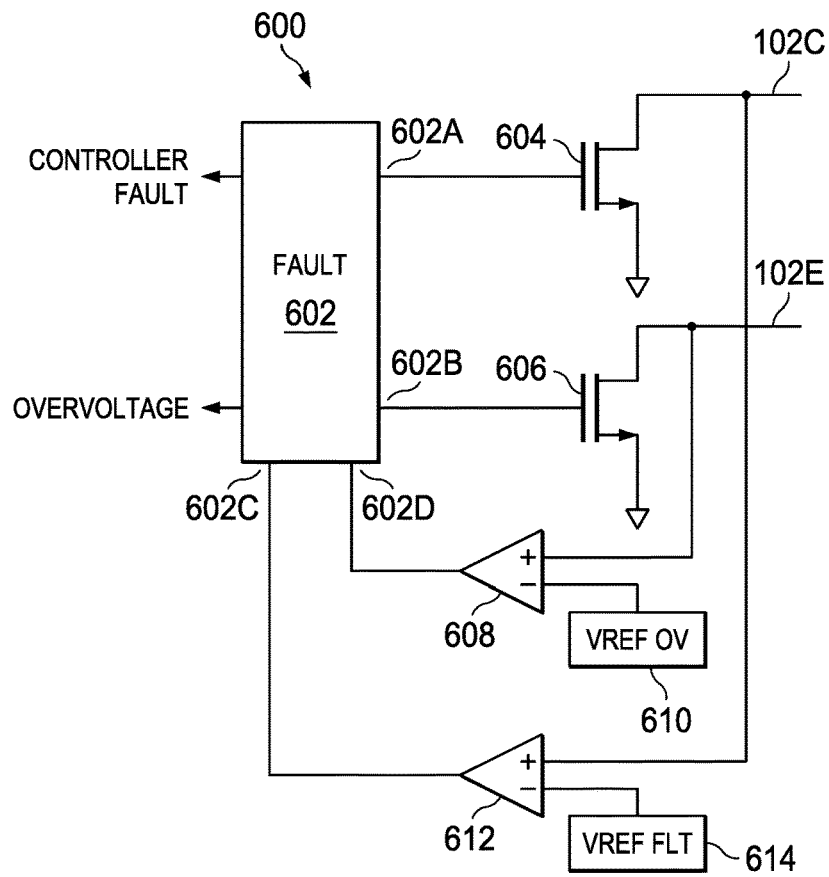
FIG. 6 is a block diagram for example fault communication circuitry included in the stacked multiphase controllers of FIG. 1.

FIG. 6 is a block diagram for an example fault communication circuit 600. The fault communication circuit 600 may be included in the inter-controller communication circuitry 124 of the multiphase controller 102 and the multiphase controller 104. The fault communication circuit 600 includes a fault circuit 602, an open drain driver 604, an open drain driver 606, a comparator 608, a comparator 612, a voltage reference circuit 610, and a voltage reference circuit 614. Operation of the fault communication circuit 600 is explained by reference to the multiphase controller 102. The multiphase controller 104 operates in similar fashion.

The fault circuit 602 detects faults (e.g., overvoltage, undervoltage, overcurrent, etc.) in the multiphase controller 102, communicates fault information to the multiphase controller 104 via the open drain driver 604 and the open drain driver 606, and receives fault information from the multiphase controller 104 via the comparator 608 and the comparator 612. An output 602A of the fault circuit 602 is coupled to the control terminal (gate) of the open drain driver 604, and an output 602B of the fault circuit 602 is coupled to the control terminal (gate) of the open drain driver 606. A first current terminal (drain) of the open drain driver 604 is coupled to the controller startup terminal 102C, and a second current terminal (source) of the open drain driver 604 is coupled to ground. A first current terminal (drain) of the open drain driver 606 is coupled to the average current terminal 102E, and a second current terminal (source) of the open drain driver 604 is coupled to ground. The open drain driver 604 and the open drain driver 606 may N-type FETs.

In some implementations of the fault communication circuit 600, the open drain driver 604 may be implemented using the open drain driver 202 of the startup synchronization circuitry 200. That is the open drain driver 202 and the open drain driver 604 may be the same transistor. After startup, the signal at the controller startup terminal 102C communicates fault information. Before startup, the signal at the controller startup terminal 102C communicates controller ready information.

The comparator 612 compares the voltage at the controller startup terminal 102C to a fault threshold voltage provided by the voltage reference circuit 614 to determine whether a fault has been detected by the multiphase controller 104. The fault threshold voltage provided by the voltage reference circuit 614 may be about 280 millivolts in some implementations of the fault communication circuit 600. The output of the comparator 612 is coupled to an input 602C of the fault circuit 602 for communication of fault information to the fault circuit 602. In some implementations of the fault communication circuit 600, the voltage reference circuit 614 may be implemented using the comparator 206 of the startup synchronization circuitry 200. That is the comparator 206 and the voltage reference circuit 614 may be the same comparator.

Different types of faults trigger different responses in the multiphase controller 102 and the multiphase controller 104. For example, some faults cause the PWM outputs (e.g., PWM outputs 102A, 102B) to transition to a high impedance state (tri-state), while other faults (e.g., overvoltage fault) cause the PWM outputs to be pulled low. Signal provided at the average current terminal 102E communicates whether the PWM outputs should be tri-stated or pulled low. For example, if the fault circuit 602 detects an overvoltage fault, then, responsive to detection of the overvoltage fault, the fault circuit 602 activates the open drain driver 604 to indicate that a fault has been detected, and activates the open drain driver 606 to indicate that the PWM outputs should be pulled low. If the fault circuit 602 detects fault for which the PWM outputs should be tri-stated, the fault circuit 602 activates the open drain driver 604 and deactivates the open drain driver 606. The fault communication circuit 600 of the multiphase controller 104 detects the signals transmitted by the multiphase controller 102 at the controller startup terminal 104C and the average current terminal 104E and initiates shutdown.

The comparator 608 compares the voltage at the average current terminal 102E to an overvoltage fault threshold voltage provided by the voltage reference circuit 610 to determine what PWM response is indicated. The overvoltage fault threshold voltage provided by the voltage reference circuit 610 may be about 280 millivolts in some implementations of the fault communication circuit 600. The output of the comparator 608 is coupled to an input 602D of the fault circuit 602 for communication of fault information to the fault circuit 602.

Figure 7:
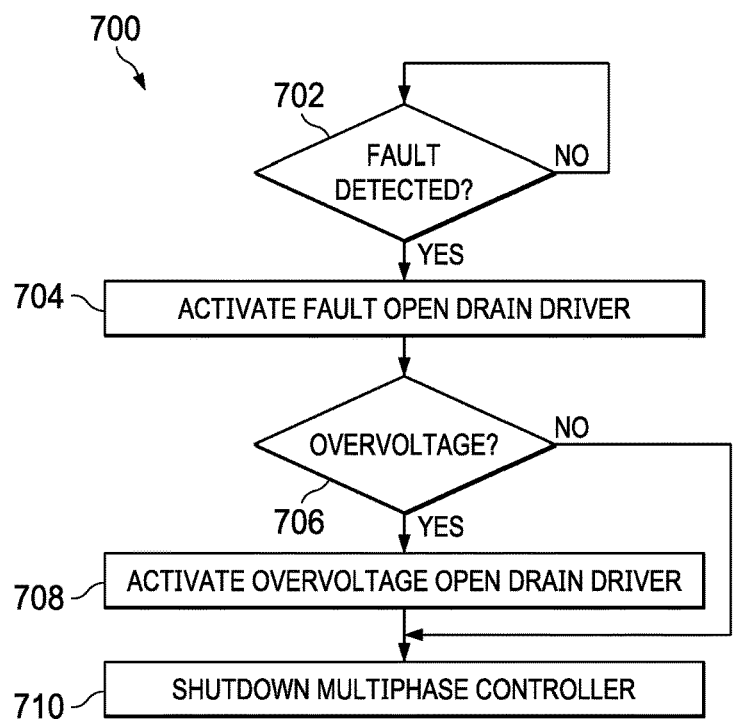
FIG. 7 is a flow diagram for an example method for fault communication in stacked multiphase controllers.

FIG. 7 is a flow diagram for an example method 700 for fault communication in stacked multiphase controllers. Though depicted sequentially as a matter of convenience, at least some of the actions shown can be performed in a different order and/or performed in parallel. Additionally, some implementations may perform only some of the actions shown. Operations of the method 700 are explained with reference to the multiphase controller 102. The multiphase controller 104 also executes the method 700.

In block 702, the fault circuit 602 is monitoring operation of the multiphase controller 102 for the presence of faults. If a fault is detected in block 702, then the fault circuit 602 activates the open drain driver 604 to pull down the voltage at the controller startup terminal 102C.

In block 706, if the fault detected in block 702 is an overvoltage fault, or other fault that requires pull down of the PWM outputs, then the fault circuit 602 activates the open drain driver 606, in block 708, to pull down the voltage at the average current terminal 102E.

In block 710, the multiphase controller 102 and the multiphase controller 104 shut down in accordance with fault information provided at the controller startup terminal 102C and the average current terminal 102E.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A multiphase controller, comprising:
an integrator enable terminal;
a pulse width modulator;
an error integrator coupled to the pulse width modulator, and including:
an enable input coupled to the integrator enable terminal;
an open drain driver including:
a current terminal coupled to the integrator enable terminal; and
a control terminal; and
an integrator enable circuit including:
a first input coupled to the pulse width modulator;
a second input coupled to the integrator enable terminal;
a first output coupled to the enable input of the error integrator; and
a second output coupled to the control terminal of the open drain driver.

2. The multiphase controller of claim 1, wherein:
the open drain driver is a first open drain driver; and
the multiphase controller further includes:
a controller startup terminal;
a second open drain driver including:
a current terminal coupled to the controller startup terminal; and
a control terminal; and
a controller enable circuit coupled to the control terminal of the second open drain driver.

3. The multiphase controller of claim 2, wherein the controller startup terminal is adapted to be coupled to a temperature sense terminal of a power stage.

4. The multiphase controller of claim 1, wherein:
the open drain driver is a first open drain driver; and
the multiphase controller further includes:
a controller fault terminal;
a second open drain driver including:
a current terminal coupled to the controller fault terminal; and
a control terminal; and
a fault circuit including an output coupled to the control terminal of the second open drain driver.

5. The multiphase controller of claim 4, wherein the controller fault terminal is adapted to be coupled to a temperature sense terminal of a power stage.

6. The multiphase controller of claim 4, further comprising:
a comparator including:
a first input coupled to the controller fault terminal;
a second input coupled to a voltage reference circuit; and
an output coupled to an input of the fault circuit.

7. The multiphase controller of claim 4, further comprising:
an average current terminal; and
a third open drain driver, including:
a current terminal coupled to the average current terminal; and
a control terminal;
wherein:
the output of the fault circuit is a first output; and
the fault circuit includes a second output coupled to the control terminal of the third open drain driver.

8. The multiphase controller of claim 7, further comprising:
a comparator including:
a first input coupled to the average current terminal;
a second input coupled to a voltage reference circuit; and
an output coupled to an input of the fault circuit.

9. A multiphase controller, comprising:
an integrator enable terminal adapted to be coupled to an integrator enable terminal of a different multiphase controller;
a pulse width modulator configured to modulate a power stage;
an error integrator configured to control the pulse width modulator;
an open drain driver coupled to the integrator enable terminal of the multiphase controller; and
an integrator enable circuit coupled to the pulse width modulator, the error integrator, the open drain driver, and the integrator enable terminal, and configured to:
activate the open drain driver responsive to generation of a power stage control pulse by the pulse width modulator; and
activate the error integrator responsive to a logic low signal at the integrator enable terminal.

10. The multiphase controller of claim 9, wherein:
the open drain driver is a first open drain driver; and
the multiphase controller further includes:
a controller startup terminal adapted to be coupled to a controller startup terminal of the different multiphase controller;
a second open drain driver coupled to the controller startup terminal; and
a controller enable circuit coupled to the second open drain driver, and configured to:
deactivate the second open drain driver responsive to the multiphase controller being ready for operation; and
activate the second open drain driver responsive to a start of initialization of the multiphase controller.

11. The multiphase controller of claim 10, wherein the controller startup terminal is adapted to be coupled to a temperature sense terminal of the power stage.

12. The multiphase controller of claim 9, wherein:
the open drain driver is a first open drain driver; and
the multiphase controller further includes:
a controller fault terminal adapted to be coupled to a controller fault terminal of the different multiphase controller;
a second open drain driver coupled to the controller fault terminal; and
a fault circuit coupled to the second open drain driver, and configured to:
activate the second open drain driver responsive to detection of a fault in the multiphase controller.

13. The multiphase controller of claim 12, wherein the controller fault terminal is adapted to be coupled to a temperature sense terminal of the power stage.

14. The multiphase controller of claim 12, further comprising a comparator configured to compare a voltage at the controller fault terminal to a fault threshold voltage.

15. The multiphase controller of claim 12, further comprising:
an average current terminal adapted to be coupled to the average current terminal of the different multiphase controller; and a third open drain driver coupled to the average current terminal and the fault circuit;
wherein the fault circuit is configured to activate the third open drain driver responsive to detection of an overvoltage fault.

16. The multiphase controller of claim 15, further comprising a comparator coupled to the average current terminal and the fault circuit, and configured to compare a voltage at the average current terminal to an overvoltage fault threshold voltage.

17. A multiphase converter, comprising:
a first multiphase controller including:
an integrator enable terminal; and
a controller startup terminal;
a power stage including a temperature sense terminal coupled to the control startup terminal of the first multiphase controller;
a second multiphase controller including:
a controller startup terminal coupled to the temperature sense terminal of the power stage;
an integrator enable terminal coupled to the integrator enable terminal of the first multiphase controller;
a pulse width modulator configured to modulate the power stage;
an error integrator configured to control the pulse width modulator;
an open drain driver coupled to the integrator enable terminal of the second multiphase controller; and
an integrator enable circuit coupled to the pulse width modulator, the error integrator, the open drain driver, and the integrator enable terminal of the second multiphase controller, and configured to:
activate the open drain driver responsive to generation of a power stage control pulse by the pulse width modulator; and
activate the error integrator responsive to the first multiphase controller generating a logic low signal at the integrator enable terminal of the second multiphase controller.

18. The multiphase converter of claim 17, wherein:
the open drain driver of the second multiphase controller is a first open drain driver; and
the second multiphase controller further includes:

a second open drain driver coupled to the controller startup terminal of the second multiphase controller; and
a controller enable circuit coupled to the second open drain driver, and configured to:
deactivate the second open drain driver responsive to the second multiphase controller being ready for operation; and
activate the second open drain driver responsive to a start of initialization of the second multiphase controller.

19. The multiphase converter of claim 18, wherein:
the second multiphase controller includes:
a third open drain driver coupled to the controller startup terminal; and
a fault circuit coupled to the third open drain driver, and configured to:
activate the third open drain driver responsive to detection of a fault in the second multiphase controller.

20. The multiphase converter of claim 19, wherein:
the first multiphase controller includes an average current terminal; and
the second multiphase controller includes:
an average current terminal coupled to the average current terminal of the first multiphase controller; and
a fourth open drain driver coupled to the average current terminal of the second multiphase controller and the fault circuit; and
the fault circuit is configured to activate the fourth open drain driver responsive to detection of an overvoltage fault.

21. The multiphase converter of claim 20, wherein the second multiphase controller includes a comparator coupled to the average current terminal of the second multiphase controller and the fault circuit, and configured to compare a voltage at the average current terminal to an overvoltage fault threshold voltage.

22. The multiphase converter of claim 17, wherein:
the second multiphase controller includes a comparator configured to compare a voltage at the controller startup terminal to a fault threshold voltage.

* * * * *